United States Patent [19]

Nix et al.

[11] Patent Number: 5,735,188

[45] Date of Patent: Apr. 7, 1998

[54] EXTERNAL SLAVE CYLINDER FOR HYDRAULIC CLUTCH RELEASE SYSTEM

[75] Inventors: Richard A. Nix, Ortonville; Leslie P. Branum, Troy, both of Mich.

[73] Assignee: Automotive Products (USA), Inc., Auburn Hills, Mich.

[21] Appl. No.: 658,022

[22] Filed: Jun. 4, 1996

[51] Int. Cl.$^6$ .................................................. F16J 15/00
[52] U.S. Cl. .............................. 92/129; 92/130 R; 92/240; 92/245; 92/249
[58] Field of Search ........................ 92/130 C, 130 R, 92/129, 240, 245, 249

[56] References Cited

U.S. PATENT DOCUMENTS

| | | | |
|---|---|---|---|
| 2,106,592 | 1/1938 | Dick | 92/130 C |
| 3,874,382 | 4/1975 | Nogier et al. | 92/245 |
| 4,454,632 | 6/1984 | Nix et al. | 24/16 PB |
| 4,478,107 | 10/1984 | Buannec | 74/863 |
| 4,551,976 | 11/1985 | Nix et al. | 60/533 |
| 4,557,361 | 12/1985 | Nix et al. | 192/85 C |
| 4,585,106 | 4/1986 | Shirley | 192/85 CA |
| 4,590,765 | 5/1986 | Leigh-Monstevens | 60/585 |
| 4,599,860 | 7/1986 | Parsons | 60/584 |
| 4,665,802 | 5/1987 | Barker et al. | 92/23 |
| 4,766,804 | 8/1988 | Barker | 92/23 |
| 4,821,627 | 4/1989 | Leigh-Monstevens | 92/107 |
| 4,827,834 | 5/1989 | Leigh-Monstevens | 92/108 |
| 4,831,916 | 5/1989 | Leigh-Monstevens et al. | 92/129 |
| 5,002,169 | 3/1991 | Barker | 192/85 C |
| 5,267,637 | 12/1993 | Wilbur et al. | 192/85 CA |

FOREIGN PATENT DOCUMENTS

| | | |
|---|---|---|
| 1379464 | 12/1964 | France . |
| 1472929 | 3/1967 | France . |
| 2680555 | 8/1991 | France . |
| 3610279 | 10/1986 | Germany . |

*Primary Examiner*—Sheldon Richter
*Attorney, Agent, or Firm*—Young & Basile, P.C.

[57] ABSTRACT

An external slave cylinder particularly suited for use in a hydraulic clutch release system for a motor vehicle. The cylinder includes a cylindrical body defining a bore, a piston slidably mounted in the bore, a seal positioned between the piston and the bore, a pushrod engaging the rear end of the piston and extending out of the bore, and a preload spring. The spring comprises a conical coil spring positioned exteriorly of the bore, bearing at the reduced diameter rear end thereof against the rear end of the pushrod, and bearing at the large diameter front end thereof against the rear end of the body in surrounding relation to the pushrod. The seal has a cup-shaped configuration and fits over a nose portion provided on the front end of the piston. The seal includes a peripheral lip portion sealingly engaging the bore and a base portion closing the area within the peripheral lip portion and seated against the front end of the piston. The full cup-shaped configuration of the seal eliminates the usual internal leak path between the inner periphery of the seal and the piston.

22 Claims, 3 Drawing Sheets

EXTERNAL SLAVE CYLINDER FOR HYDRAULIC CLUTCH RELEASE SYSTEM

BACKGROUND OF THE INVENTION

This invention relates to hydraulic pressure cylinders and more particularly to a hydraulic slave cylinder especially suitable for use in a motor vehicle clutch release system.

A hydraulic clutch release system typically consists of a clutch, a release bearing, a release lever, a slave cylinder, and a master cylinder operated by a clutch pedal. It is desirable that free play between the clutch release bearing, release lever and slave cylinder be eliminated to achieve good efficiency. This is normally achieved by providing a preload spring in the slave cylinder.

A typical slave cylinder consists of a body defining a cylindrical bore having a closed front end and an open rear end; a piston slidably mounted in the bore; a pushrod having a forward end associated with the piston and projecting out of the open rear end of the bore; and a preload spring. The preload spring is normally fitted between the closed front end of the bore and the piston. The spring thereby provides a load to the piston preloading against the pushrod and in turn against the release lever, bearing and clutch.

The preload spring causes the piston and pushrod to extend when the slave cylinder is not fitted to the vehicle. During assembly to the vehicle, it is necessary to depress the pushrod and piston before attaching the slave cylinder to the clutch housing. This operation is difficult because, in the case of the commonly employed prefilled hydraulic system, fluid must be displaced from the slave cylinder to the master cylinder and finally to the reservoir. In an effort to save assembly time, it is normal practice to fit a breakable shipping strap to the slave cylinder to restrain the pushrod in a good position for assembly. However, the shipping strap adds considerable cost to the system since the strap must be manufactured, applied to the prefilled slave cylinder, and then broken by depressing the clutch pedal after fitting the slave cylinder to the clutch housing.

The typical slave cylinder further includes a seal positioned on the piston and sealingly engaging the cylindrical bore so as to preclude leakage of hydraulic fluid or air past the piston. The seal typically consists of an annular ring including an outer lip which contacts the bore and an inner diameter which contacts the piston. It has been found that fluid leakage or air ingestion can occur between the piston and the inner seal diameter, especially if the seal is allowed to shuffle axially under load on the piston. A shoulder is normally provided on the piston to limit this axial shuffling movement but it is not possible to achieve zero axial movement for all combinations of tolerances. A leak path is thus provided between the piston and the inner diameter of the seal which allows fluid leakage past the seal, or air ingestion into the fluid chamber, with consequent degradation of the reliability of the cylinder.

SUMMARY OF THE INVENTION

This invention is directed to the provision of an improved external slave cylinder.

More specifically, this invention is directed to the provision of an external slave cylinder which is especially suitable for use in a motor vehicle clutch release system.

The invention relates to a pressure cylinder assembly of the type including a body member defining a cylindrical bore having a closed front end and an open rear end; a piston slidably received in the bore and defining a front end defining a front face facing the closed end of the bore; and a pushrod having a forward end associated with the piston and projecting out of the open rear end of the bore to position a rear end of the pushrod rearwardly of the rear end of the bore.

According to an important feature of the invention, a coil preload spring is provided positioned exteriorally of the bore, bearing at a rearward end thereof against the pushrod, and bearing at a forward end thereof against the body member. This arrangement allows the spring to be moved to a preload condition simply by depressing the pushrod without displacing fluid from the cylinder bore, thereby obviating the need for a shipping or restraining strap to maintain the assembly in the preload condition for shipping and installation. The external spring arrangement also removes the spring from the hydraulic fluid thereby eliminating the potential for metal particles or process oils from contaminating the hydraulic fluid. The external spring arrangement also eliminates the problem of leakage caused by damage to the hydraulic bore due to the spring rubbing the bore during actuation.

According to a further feature of the invention, the piston defines a front end defining a front face facing the closed end of the bore and the assembly further includes a seal of elastomeric material including a main body portion positioned over the front end of the piston in covering relation to the piston front face and a peripheral lip portion sealingly engaging the cylindrical bore. This arrangement eliminates the leak path between the piston and the inner periphery of the seal to thereby improve the reliability of the cylinder assembly and further allows greater tolerance in the manufacture of the seal since imperfections, sinks and parting lines in the seal do not result in the establishment of a leak path between the piston and the seal.

According to a further feature of the invention, the placement of the preload spring externally of the bore facilitates the use of a full base cup seal totally covering the front end of the piston since the cup seal need not provide an anchor point for one end of the spring as would be the case if the spring were located in typical fashion within the bore of the cylinder between the piston and the closed end of the bore.

DETAILED DESCRIPTION OF THE PREFERRED EMBODIMENT

Figure 1:
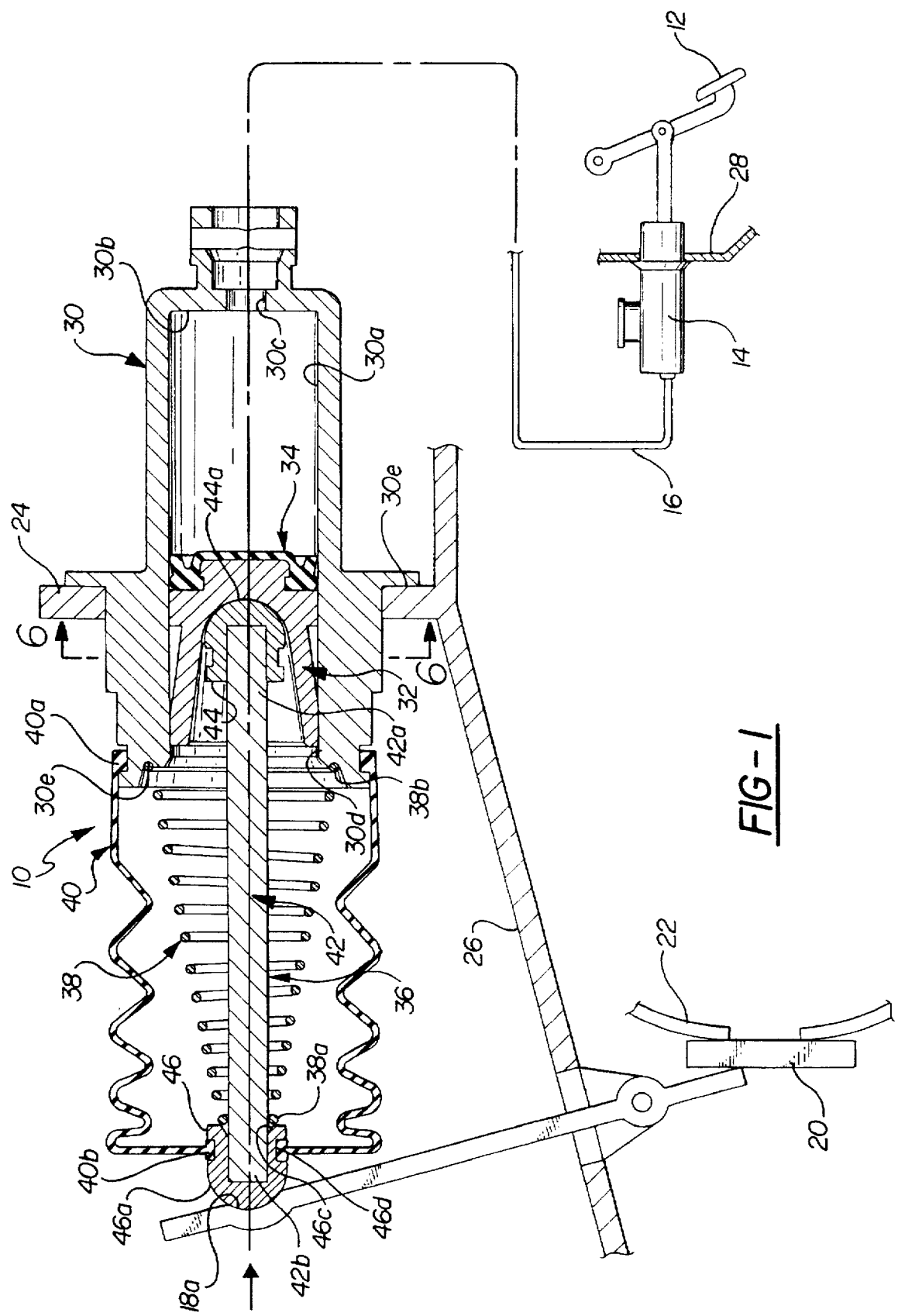
FIG. 1 is a cross-sectional view of a motor vehicle clutch release system employing a slave cylinder according to the invention.
Figure 2:
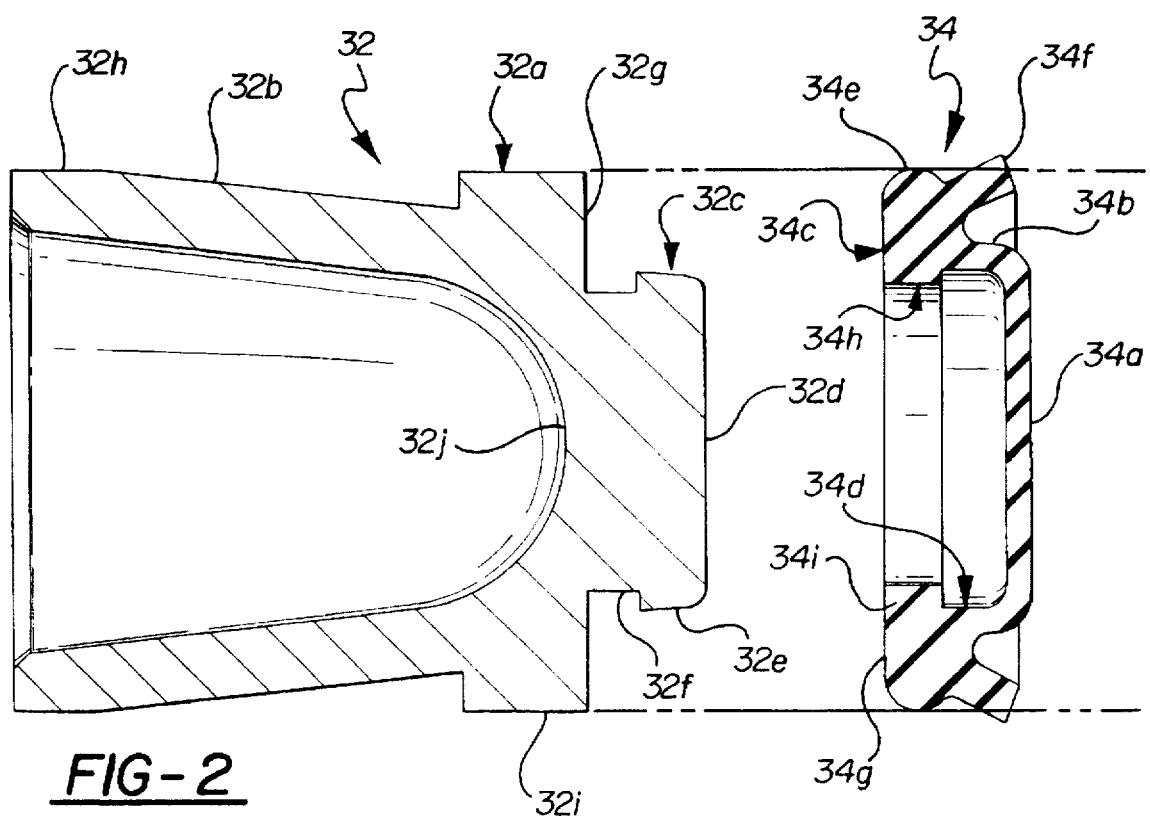
FIG. 2 is a detail exploded view of a piston and seal employed in the slave cylinder of FIG. 1.
Figure 3:
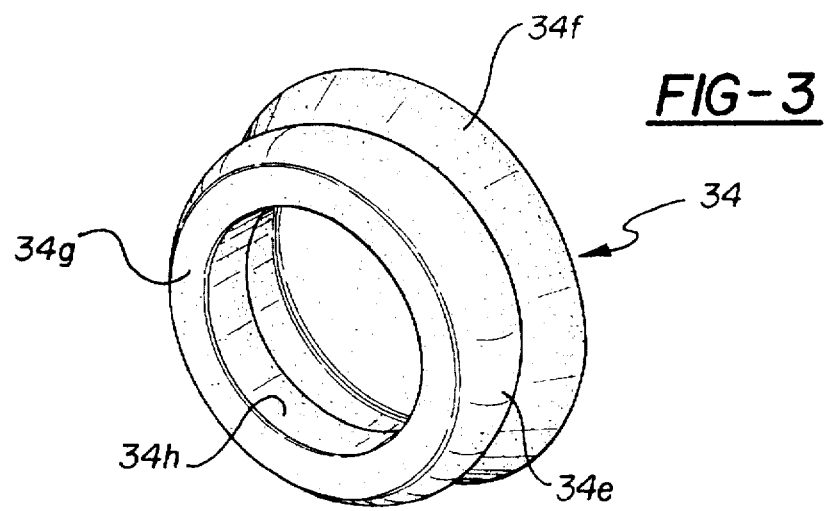
FIGS. 3 and 4 are perspective views of the seal.
Figure 4:
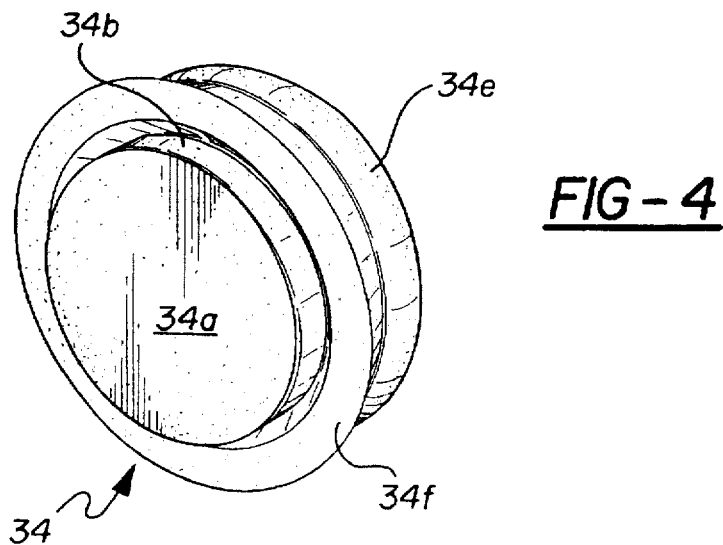
Figure 5:
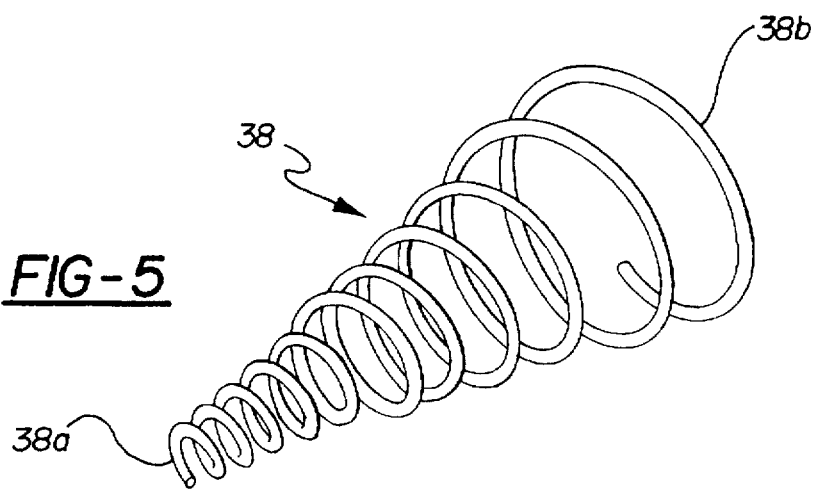
FIG. 5 is a perspective view of a spring employed in the slave cylinder.
Figure 6:
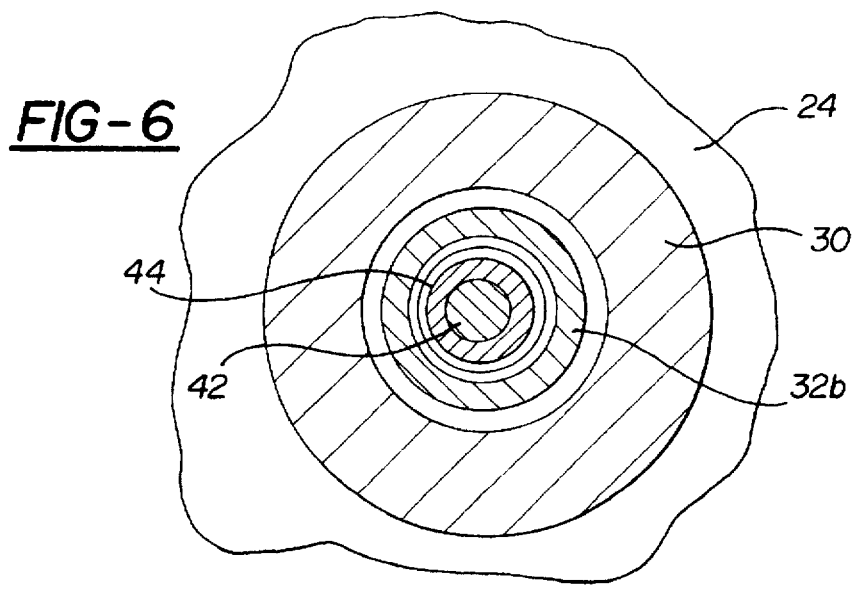
FIG. 6 is a cross-sectional view taken on line 6—6 of FIG. 1.

The slave cylinder assembly 10 of the invention is seen in FIG. 1 incorporated as a part of a hydraulic motor vehicle clutch release system including a clutch pedal 12, a master cylinder 14, a conduit 16 interconnecting the outlet of the master cylinder with the inlet of the slave cylinder, a clutch release lever 18 actuated by the slave cylinder, a clutch release bearing 20, and the spring fingers 22 of the diaphragm spring of the clutch. It will be understood that depression of clutch pedal 12 displaces pressurized hydraulic fluid from master cylinder 14 which is transmitted by a conduit 16 to slave cylinder 10 which extends to pivot release lever 18 and move release bearing 20 against the bias of spring fingers 22 in a direction to disengage the clutch. Slave cylinder assembly 10 is shown mounted on a flange 24 projecting upwardly from the bell housing 26 of the clutch and master cylinder 14 is shown mounted on the firewall 28 of the motor vehicle.

Slave cylinder assembly 10 includes a cylinder body member 30, a piston 32, a seal 34, a pushrod assembly 36, a spring 38, and a boot 40.

Body member 30 defines a cylindrical bore 30a having a closed front end 30b through which pressurized fluid is delivered from the master cylinder via a port 30c and an open rear end 30d. Body 30 further defines an annular seat 30e proximate the rear end of the body member and in surrounding relation to bore 30a. Body 30 further includes a flange 30e to facilitate mounting of the slave cylinder such as, for example, on flange 24. Body member 30 may be formed of a suitable rigid material such as a suitable plastic.

Piston 32 is slidably received in bore 30a and has a general diameter corresponding to the diameter of bore 30a. Piston 32 includes a main body cylindrical portion 32a, a conical hollow tail portion 32b, and a nose portion 32c projecting centrally forwardly from main body portion 32a.

Nose portion 32c includes a front face 32d, an annular side wall 32e, and a reduced diameter neck portion 32f. Main body portion 32a defines an annular surface 32g in surrounding relation to nose portion 32c. Annular surface 32g and the front face 32d of the nose portion coact to define a front face of the piston facing the closed end of bore 30a. The piston 32 may be formed of a suitable rigid material such as plastic.

Seal 34 is formed of an elastomeric material, has a rearwardly opening cup configuration, and is sized to fit over the nose portion 32c of the piston. Seal 34 includes a base portion 34a, an annular side wall portion 34b, and a rim portion 34c. Base portion 34a coacts with side wall portion 34b to define a bore 34d. Rim portion 34c defines a heel seal 34e and a lip seal 34f. Rim portion 34c further defines a rear facing annular surface 34g and a counterbore 34h defining an annular radially inwardly extending ridge portion 34i.

Seal 34 is removably positioned against the front face of the piston with the annular side wall portion 34b positioned around annular side Wall portion 32e of the piston nose portion, the base portion 34a positioned against the front face 32d of the piston nose portion, the ridge portion 34i positioned within the neck portion 32f of the piston nose portion, and the annular rear face 34g positioned against the annular front face 32g defined on the front end of the piston.

With the piston and seal subassembly installed in bore 30a, cylindrical outer surface 32h of piston tail portion 32b and the outer periphery 32i of the piston main body portion slidably engage the bore and the heel seal 34e and lip seal 34f of seal 34 sealingly engage the bore to preclude leakage of hydraulic fluid rearwardly past the piston or ingestion of air forwardly past the piston into the hydraulic fluid.

Pushrod assembly 36 includes a pushrod 42, a front end cap 44, and a rear end cap 46. Front end cap 44 is positioned on the front end 42a of the pushrod and defines an arcuate forward surface 44a adapted to be seated against a central arcuate surface 32j defined within the hollow of the tail portion of the piston. Rear end cap 46 is fitted over the rear end 42b of the pushrod and defines an arcuate surface 46a fitted within an arcuate surface 18a defined on the upper end of the clutch release lever 18.

Spring 38 is a conical coil spring and includes a small rear end 38a seated against an annular seat 46c defined at the forward end of the cap 46 and a large front end 38b positioned in seat 30e of the body 30 in surrounding relation to the rear end of the bore 30a.

Boot 40 has a bellows, pleated configuration and is formed of a suitable elastomeric material. Boot 40 includes a forward annular bead 40a positioned in a groove 40f provided in the outer surface of body 30 proximate the rear end of the body and further includes a rear bead 40b positioned in an annular external groove 46d defined by rear cap 46. In the assembled relation it will be seen that coil spring 38 is positioned in surrounding relation to pushrod 36 and boot 40 is positioned in surrounding relation to coil spring 38.

The invention slave cylinder will be seen to avoid the need for a shipping strap while yet retaining a preload spring in the slave cylinder to eliminate free play between the clutch release bearing, the release lever and the slave cylinder. When the invention slave cylinder is provided in prefilled form the pushrod is extended by the spring but the piston is set in a good position for ease of assembly. When the slave cylinder is fitted to the clutch release system it is necessary to move the pushrod forwardly and compress the spring to allow the rear end cap 46 to be positioned in the pocket 18a of the clutch release lever. However, this operation does not require displacement of hydraulic fluid back through the line 16 and through the master cylinder 14 to the reservoir. Rather, the piston 32 is set in a good position for ease of assembly and, specifically, is positioned within the bore 38 in forwardly spaced relation to the front end of the pushrod so that the forward movement of the pushrod to compress the spring 38 and shorten the slave cylinder for mounting against the clutch release lever does not require any displacement of fluid out of the slave cylinder. Rather, the piston maintains its position within bore 38 during this forward movement of the pushrod and compression of the spring 38 due to seal friction on the bore 38. After the slave cylinder has been installed in the manner described, a few strokes of the clutch pedal 12 is all that is necessary to adjust the slave piston into contact with the front end of the pushrod and provide normal operation of the clutch release assembly.

The position of the pushrod in FIG. 1 is an extended position in which clutch pedal 12 has been depressed to move hydraulic fluid from the master cylinder to the slave cylinder to extend the piston and pushrod rearwardly and pivot clutch release lever 18 in a clutch disengaging direction. As the pushrod extends rearwardly, spring 38, which has been compressed to enable fitting of the slave cylinder to the clutch release system, is allowed to expand and relax. Thereafter, the spring is moved to a compressed preload condition as the clutch pedal is released to reengage the clutch with the clutch reengaged, the spring again functions as a preload spring to take up slack in the clutch release system.

During operation of the slave cylinder to achieve clutch engagement and disengagement, seal 34 operates to preclude leakage of hydraulic fluid rearwardly past the seal or leakage of air forwardly past the seal. This preclusion of leakage is achieved by providing a full base cup seal to eliminate the internal leak path between the inner diameter of the seal and the piston. Further, it is desirable for cost reasons to mold the piston in a plastic material such as nylon 6/6 with fiber reinforcement. However, due to the inherent nature of the molding process, small imperfections, sink marks or mold parting lines can occur in the sealing diameter of the piston which, with the usual annular ring seal, can cause leakage or air ingress between the piston and the seal. However, with the full cup seal, such imperfections, sink marks, or mold parting lines do not interfere with the effectiveness of the seal, thereby allowing the low cost plastic molding process to be utilized to form the piston without degrading the performance of the seal.

Whereas a preferred embodiment of the invention has been illustrated and described in detail, it will be apparent that the various changes may be made in the disclosed embodiment without departing from the scope or spirit of the invention.

We claim:

1. A pressure cylinder assembly comprising:

a body member defining a cylindrical bore having a closed front end and an open rear end;

a piston slidably received in the bore and defining a front end defining a front face facing the closed end of the bore;

a seal of elastomeric material having a rearwardly opening cup configuration, being fitted over the front end of the piston, and including a base portion positioned against the front end of the piston in covering relation to the piston front face and a peripheral lip portion sealingly engaging the cylindrical bore; and a push rod having a forward end associated with the piston and projecting out of the open rear end of the bore to position a rear end of the push rod rearwardly of the rear end of the bore.

2. A cylinder assembly according to claim 1 wherein the cylinder assembly further includes a boot of flexible material positioned over the pushrod and including an annular front end seated on the body member in surrounding relation to the rear end of the bore and an annular front end seated proximate and in surrounding relation to the rear end of the pushrod.

3. A cylinder assembly according to claim 2 wherein the boot has a pleated, bellows configuration.

4. A cylinder assembly according to claim 1:

the piston includes a forwardly extending nose portion defining an annular side wall and a front face;

the seal includes an annular side wall portion fitted over the annular side wall of the nose with the base portion of the seal fitted against the front face of the nose; and the peripheral lip portion of the seal is positioned in concentric surrounding relation to the annular side wall portion of the seal.

5. A cylinder assembly according to claim 4 wherein:

the annular side wall portion of the nose includes a rearward annular neck portion of reduced diameter; and the seal includes an annular radially inwardly extending ridge portion sized to fit in the annular neck portion of the nose.

6. A cylinder assembly according to claim 4 wherein:

the front face of the piston includes an annular surface in surrounding relation to the nose; and the seal defines an annular rear surface seated against the annular surface.

7. A cylinder assembly according to claim 6 wherein:

the assembly further includes a coil spring positioned exteriorally of the bore, bearing at a rear end thereof against the pushrod, and bearing at a forward end thereof against the body member; and the spring is a conical spring having a small rear end and a large front end.

8. A cylinder assembly according to claim 7 wherein:

the body member defines an annular seat proximate and in surrounding relation to the rear end of the bore; and the front end of the spring is seated in the annular seat.

9. A cylinder assembly according to claim 7 wherein:

an annular seat is defined proximate and in surrounding relation to the rear end of the pushrod; and the rear end of the spring is seated in the annular seat.

10. A hydraulic pressure cylinder assembly comprising:

a body member defining an imperforate cylindrical wall defining a cylindrical bore having a closed front end and an open rear end;

a piston slidably received in the bore and defining a front end defining a front face facing the closed end of the bore and coacting with the closed end of the bore to define a forward chamber containing hydraulic fluid and a tail portion facing the open rear end of the bore to define a rear chamber containing air;

a seal of elastomeric material including a base portion positioned against the front end of the piston in covering relation to the piston front face and a peripheral lip portion sealingly engaging the cylindrical bore to preclude leakage of hydraulic fluid rearwardly past the piston or ingestion of air forwardly past the piston into the hydraulic fluid;

a pushrod having a forward end associated with the piston and projecting out of the open rear end of the bore to position a rear end of the pushrod rearwardly of the rear end of the bore; and a coil spring positioned externally of the bore, bearing at a rearward end thereof against the pushrod, and bearing at a forward end thereof against the body member.

11. A cylinder assembly according to claim 1 wherein the cylinder assembly further includes a boot of flexible material positioned over the pushrod and the spring and including an annular front end seated on the body member in surrounding relation to the rear end of the bore and an annular front end seated proximate and in surrounding relation to the rear end of the pushrod.

12. A cylinder assembly according to claim 11 wherein the boot has a pleated, bellows configuration.

13. A cylinder assembly according to claim 1 wherein the coil spring bears at its rear end against the pushrod proximate the rear end of the pushrod and bears at its forward end against the body member proximate the rear end of the bore.

14. A cylinder assembly according to claim 13 wherein the coil spring is a conical spring having a small rear end and a large front end.

15. A cylinder assembly according to claim 14 wherein:

the body member defines an annular seat proximate and in surrounding relation to the rear end of the bore; and the front end of the spring is seated in the annular seat.

16. A cylinder assembly according to claim 14 wherein:

an annular seat is defined proximate and in surrounding relation to the rear end of the pushrod; and the rear end of the spring is seated in the annular seat.

17. A pressure cylinder assembly comprising:

a body member defining a cylindrical bore having a closed front end and an open rear end;

a piston slidably received in the bore and defining a front end defining a front face facing the closed end of the bore;

a seal of elastomeric material having a rearwardly opening cup configuration, being fitted over the front end of the piston, and including a base portion positioned against the front end of the piston in covering relation to the piston front face and a peripheral lip portion sealingly engaging the cylindrical bore;

a pushrod having a forward end associated with the piston and projecting out of the open rear end of the bore to position a rear end of the pushrod rearwardly of the rear end of the bore; and a coil spring positioned externally of the bore, bearing at a rearward end thereof against the pushrod, and bearing at a forward end thereof against the body member.

18. A cylinder assembly according to claim 17 wherein:

the front end of the piston includes a forwardly extending nose portion defining an annular side wall and a front face;

the seal includes an annular side wall portion fitted over the annular side wall of the nose with the base portion of the seal fitted against the front face of the nose; and the peripheral lip portion of the seal is positioned in concentric surrounding relation to the annular side wall portion of the seal.

19. A cylinder assembly according to claim 18 wherein:

the annular side wall of the nose includes a rearward annular neck portion of reduced diameter; and the seal includes an annular radially inwardly extending ridge portion sized to fit in the annular neck portion of the nose.

20. A cylinder assembly according to claim 18 wherein:

the front face of the piston includes an annular surface portion in surrounding relation to the nose; and the seal defines an annular rear surface seated against the annular surface portion.

21. A pressure cylinder assembly comprising:

a body member defining a cylindrical bore having a closed front end and an open rear end;

a piston slidably received in the bore;

a pushrod having a forward end associated with the piston and projecting out of the open rear end of the bore to position a rear end of the pushrod rearwardly of the rear end of the bore; and a coil spring positioned exteriorally of the bore;

the pushrod being free to move axially relative to the piston and the coil spring having a conical configuration including a large rear end bearing against the body member proximate the open rear end of the bore and a small forward end bearing against the piston rod proximate the rear end of the piston rod.

22. A pressure cylinder according to claim 21 wherein the bore of the pressure cylinder is filled with hydraulic fluid between the piston and the closed front end of the bore.

* * * * *

UNITED STATES PATENT AND TRADEMARK OFFICE
CERTIFICATE OF CORRECTION

PATENT NO. : 5,735,188
DATED : April 7, 1998
INVENTOR(S) : Nix et al.

It is certified that error appears in the above-indentified patent and that said Letters Patent is hereby corrected as shown below:

Column 6, Line 35, delete "claim 1" and insert --claim 10--.

Column 6, Line 44, delete "claim 1 and insert --claim 10--.

Signed and Sealed this

Fifteenth Day of September, 1998

Attest:

BRUCE LEHMAN

*Attesting Officer*   *Commissioner of Patents and Trademarks*